July 7, 1925.
G. M. GARRIS
DRAFT TREE CLIP
Filed Aug. 16, 1924
1,544,899
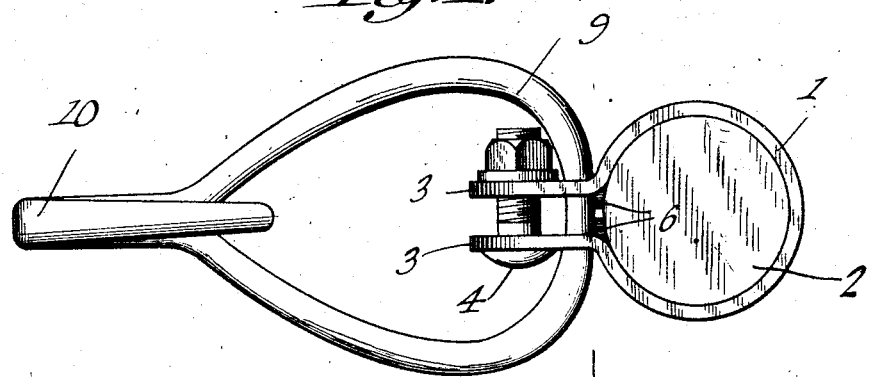
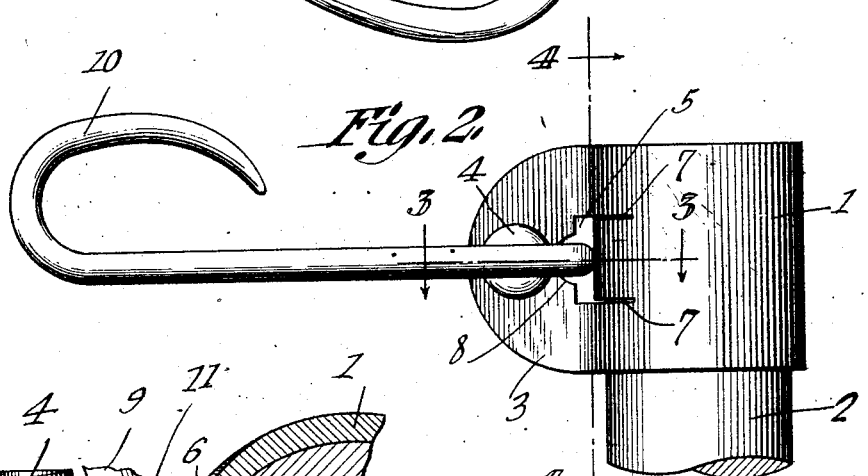
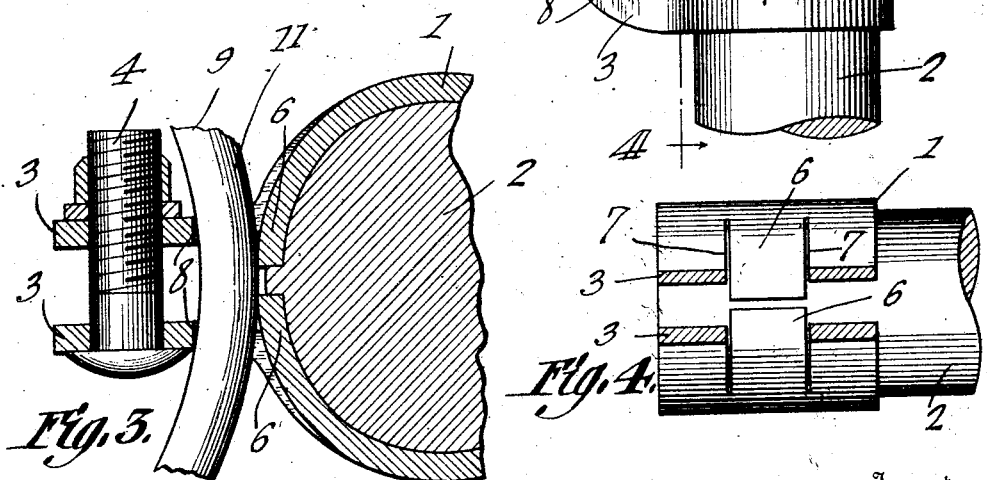
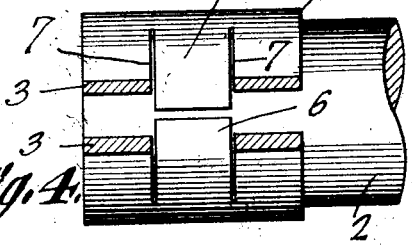
Inventor
G. M. Garris Patented July 7, 1925.

1,544,899

UNITED STATES PATENT OFFICE.

GEORGE M. GARRIS, OF SARGENT, NEBRASKA.

DRAFT-TREE CLIP.

Application filed August 16, 1924. Serial No. 732,455.

*To all whom it may concern:*

Be it known that I, GEORGE M. GARRIS, a citizen of the United States, residing at Sargent, in the county of Custer and State of Nebraska, have invented a new and useful Draft-Tree Clip, of which the following is a specification.

The device forming the subject matter of this application is a clip, adapted to be mounted on a tree, with a single-tree or a double-tree, on the end of the tree, or anywhere else along the tree.

The invention aims to provide novel means whereby the clip may be held securely on the tree, it being possible to shift, repair, renew or remove the tree readily at the will of an operator.

It is within the scope of the disclosure to improve generally and to enhance the utility of devices of that type to which the invention appertains.

With the above and other objects in view, the invention consists in the novel construction and arrangement of parts hereinafter described, it being understood that, within the scope of what is claimed, a mechanic may make changes in the structure shown, without departing from the spirit of the invention.

In the accompanying drawings:—

Figure 1 shows in end elevation, the draft tree whereon the device forming the subject matter of this application has been mounted;

Figure 2 is a top plan;

Figure 3 is a section on the line 3—3 of Figure 2, parts remaining in elevation; and Figure 4 shows a section taken about on the line 4—4 of Figure 2.

In carrying out the invention, there is provided a socket 1, adapted to be mounted on a draft tree 2. Although the socket 1 has been shown as mounted on the end of the draft tree 2, it will be understood that the socket may be placed anywhere on the draft tree, and may be used in connection with any sort of a draft tree. The socket 2 is provided with outstanding flanges 3, connected by securing and tightening device 4 which may be a bolt and nut, the construction being such that when the securing device 4 is tightened up, the socket 1 will be caused to grip the draft tree 2. The openings 5 are formed in the flanges 3 and in the socket 1, and the material freed in the formation of the openings 5 is extended circumferentially of the tree 2, to form tongues 6, there being slits 7, in the socket 1, on each side of each tongue 6. In the flanges 3, at the outer ends of the openings 5, seats 8 are fashioned. A loop-shaped connecting element 9 extends through the openings 5 and is mounted to rock in the seats 8. The connecting element 9 may include a hook 10, or other means whereby the connecting element may be assembled with a harness trace. When a trace is first mounted on the hook 10, the connecting element 9, acting as a lever, fulcrums intermediate its ends (Figure 3) in the seats 8 of the flanges 3, and the bend 11 of the connecting element presses the tongues 6 into the draft tree 2, thereby enhancing the hold of the device on the draft tree.

What is claimed is:—

In a device of the class described, a socket adapted for mounting upon a draft tree, the socket having flanges and a free-ended tongue, a tightening device connecting the flanges and operating to hold the tongue in close relation to a draft tree, a lever fulcrumed on the flanges and engaging the tongue to press the tongue against a draft tree, and means for operating the lever, said means consisting of a trace connection on the lever.

In testimony that I claim the foregoing as my own, I have hereto affixed my signature in the presence of two witnesses.

GEORGE M. GARRIS.

Witnesses:
C. H. KIKER,
EDWARD T. LARSON.